(12) United States Patent
Liao

(10) Patent No.: US 9,302,147 B2
(45) Date of Patent: Apr. 5, 2016

(54) UP AND DOWN RECIPROCATION TREADING LEISURE EXERCISE APPARATUS

(71) Applicant: HSIN LUNG ACCESSORIES CO., LTD., Hsin-Chu Hsien (TW)

(72) Inventor: Hsueh-Sen Liao, Hsin-Chu Hsien (TW)

(73) Assignee: HSIN LUNG ACCESSORIES CO., LTD., Hsin-Chu Hsien (TW)

( * ) Notice: Subject to any disclaimer, the term of this patent is extended or adjusted under 35 U.S.C. 154(b) by 222 days.

(21) Appl. No.: 14/160,638

(22) Filed: Jan. 22, 2014

(65) Prior Publication Data

US 2014/0315692 A1    Oct. 23, 2014

(30) Foreign Application Priority Data

Apr. 23, 2013 (TW) .............................. 102207379 U
Jul. 25, 2013 (TW) .............................. 102214016 U

(51) Int. Cl.
| | | |
|---|---|---|
| *B62M 1/24* | (2013.01) | |
| *A63B 22/04* | (2006.01) | |
| *B62M 1/28* | (2013.01) | |
| *B62K 3/00* | (2006.01) | |

(52) U.S. Cl.
CPC ................. *A63B 22/04* (2013.01); *B62K 3/002* (2013.01); *B62M 1/28* (2013.01)

(58) Field of Classification Search
CPC .......... A63B 22/04; B62K 3/002; B62M 1/28
USPC ................................................ 280/252, 217
See application file for complete search history.

(56) References Cited

U.S. PATENT DOCUMENTS

| | | | | |
|---|---|---|---|---|
| 4,779,485 A | * | 10/1988 | Dollison ................... | B62M 1/10 180/165 |
| 5,118,205 A | * | 6/1992 | Hoffmann ............... | B62K 19/34 384/458 |
| 6,402,173 B1 | * | 6/2002 | Chiu ......................... | B62M 1/24 280/252 |
| 7,011,376 B2 | * | 3/2006 | Sepulveda ............... | B62M 1/28 280/252 |
| 7,059,686 B2 | * | 6/2006 | Kanehisa ............ | B60B 27/0005 301/110.5 |
| 7,267,030 B2 | * | 9/2007 | French ..................... | B62M 3/00 280/210 |
| 8,215,654 B1 | * | 7/2012 | Leser ....................... | B62M 1/28 280/241 |
| 2003/0173755 A1 | * | 9/2003 | Lachenmayer .......... | B62M 1/28 280/252 |
| 2008/0023933 A1 | * | 1/2008 | Fan ......................... | B62K 3/002 280/252 |
| 2008/0106061 A1 | * | 5/2008 | Meguerditchian ..... | B62K 3/002 280/253 |
| 2014/0319795 A1 | * | 10/2014 | Scolari ..................... | B62M 1/24 280/252 |

* cited by examiner

*Primary Examiner* — Kevin Hurley
*Assistant Examiner* — Marlon Arce
(74) *Attorney, Agent, or Firm* — Jackson IPG PLLC; Demian K. Jackson

(57) ABSTRACT

An up and down restoration treading leisure exercise apparatus comprises a rack body, a rear wheel shaft gear, a braking component, an unidirectional flywheel, a spindle component, a chain wheel, a driving belt and a transmission belt. The spindle component is disposed to the rack body. The shaft core of the spindle component is provided for mounting the unidirectional flywheel and the chain wheel. The driving belt is circularly disposed to the unidirectional flywheel to provide unidirectional transmission force. When a user downwardly treads the braking component, the branch bar of the braking component will pull the driving belt and enable the unidirectional flywheel and the chain wheel at the same axis to synchronously rotate. The chain wheel drives the rear wheel shaft gear and the rear wheel through the transmission belt.

11 Claims, 5 Drawing Sheets

UP AND DOWN RECIPROCATION TREADING LEISURE EXERCISE APPARATUS

BACKGROUND OF THE INVENTION

1. Field of the Invention

The invention relates to an up and down reciprocation treading leisure exercise apparatus, and more particularly to a leisure exercise apparatus having simple structure, convenient assembling and capable of simply and exactly transmitting reciprocation treaded driving force to achieve expected up and down reciprocation treading-on effect.

2. Description of the Related Art

A way of treading and driving a conventional bicycle is that a chain wheel and left and right cranks are mainly disposed to the bottom bracket, wherein a pedal is respectively disposed to the left and right cranks, and two pedals are mutually configured at 180 included angle. Accordingly, both feet of a user alternately tread the pedal at circular movement so that the chain wheel can drive the rear wheel to rotate through a free wheel during rotation. In another word, the conventional way of treading the bicycle is achieved by performing circumference treading exercise via feet. This way, of course, may have excellent efficiency and is habitually practiced by the user while riding the bicycle.

However, to achieve the efficiency and comfort in riding, this way must require the bicycle frame equipped with the seat cushion sat by the rider. Otherwise, if both foot of the rider performs circumference treading motion long time at standing posture, the user will feel exhausted, uncomfortableness and inefficiency without matching human factors engineering. Moreover, when the bicycle is operated at short distances with respect to transportation, leisure and exercise purposes, this way of always allowing both feet to drive the bicycle through circumference treading is boring and has no fun. Consequently, exercise effect may not be efficiently improved.

SUMMARY OF THE INVENTION

Therefore, upon the foregoing problems, it is an objective of the present invention to provide a leisure exercise apparatus having simple structure and convenient assembling and capable of exactly delivering reciprocation treaded driving force, thereby achieving up and down treading effect.

To achieve the foregoing objective, the leisure exercise apparatus according to the invention comprises a rack body, a rear wheel shaft gear, a braking component, an unidirectional flywheel, a spindle component, a chain wheel, a driving belt and a transmission belt. The spindle component is disposed to the rack body. A shaft core of the spindle component is provided for mounting the unidirectional flywheel and the chain wheel. The driving belt is circularly disposed to the unidirectional flywheel to provide unidirectional transmission power.

When a user downwardly treads the braking component, the branch bar of the braking component will pull the driving belt and enable the unidirectional flywheel and the chain wheel at the same axis to synchronously rotate. The chain wheel drives the rear wheel shaft gear and the rear wheel through the transmission belt. While raising the feet of treading the braking component, the driving belt is utilized to incorporate with idle operation of the unidirectional flywheel so that the driving belt pulls the branch bar again and enables the braking component to automatically perform upward swinging motion, thereby preparing next downward treading motion.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
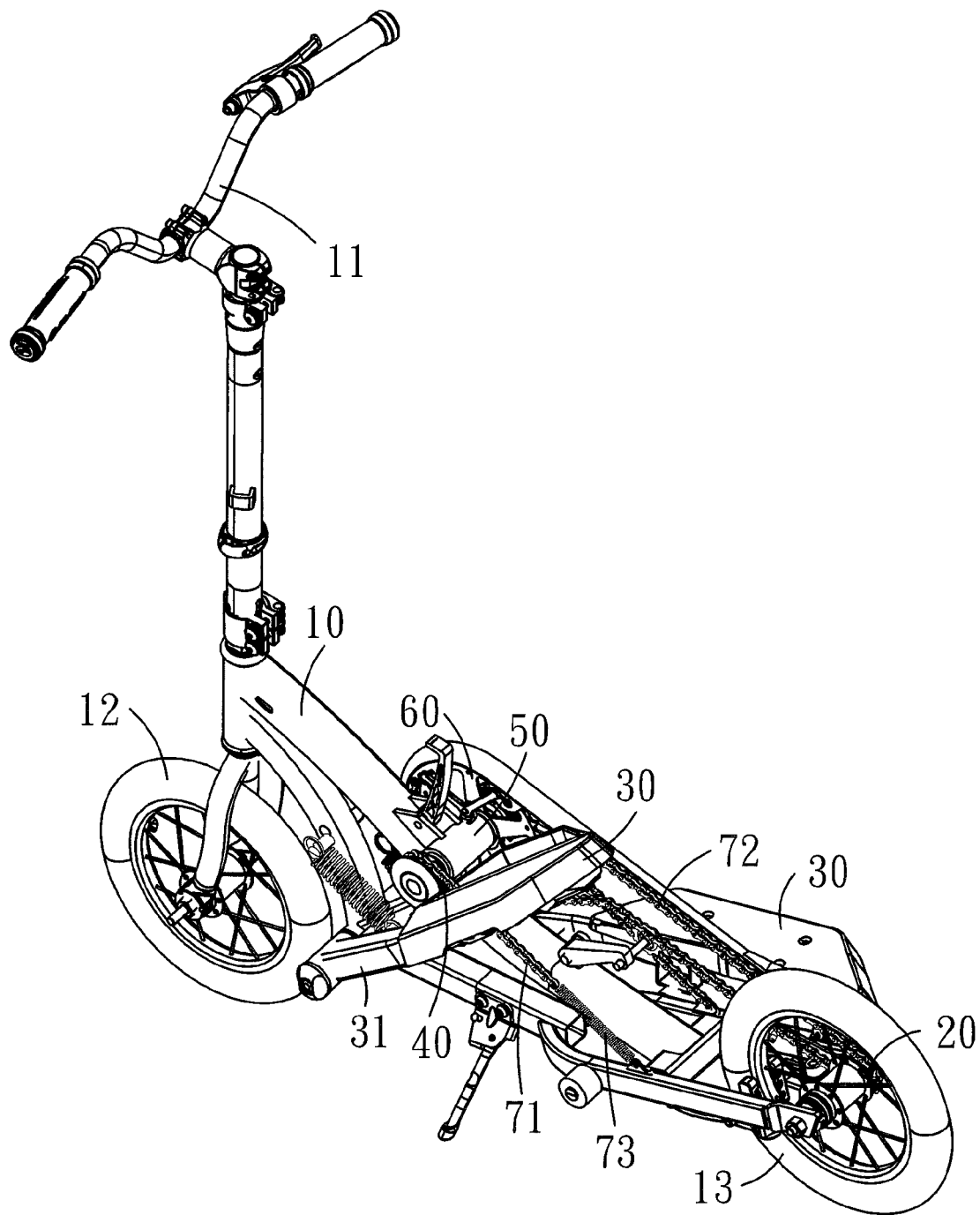
FIG. 1 is a three-dimensional structure drawing of a leisure exercise apparatus according to the invention.

With reference to FIG. 1 for structural three-dimensional drawing of a leisure exercise apparatus according to the invention is depicted. The leisure exercise apparatus according to the invention comprises a rack body 10, a rear wheel shaft gear 20, a breaking component 30, unidirectional flywheels 40, a spindle component 50, a chain wheel 60, a driving belt 71 and a transmission belt 72.

A handle 11 and a front wheel 12 are respectively disposed at an upper and a lower side in front of the rack body 10. A rear wheel 13 is disposed at a rear side of the rack body 10. The rear wheel shaft gear 20 is axially disposed to a shaft center of the rear wheel 13. The rear wheel shaft gear 20 can also be replaced by the rear wheel shaft flywheel. The braking element 30 is pivoted to the rack body 10 through a branch bar 31 as shown in the embodiment. The braking component 30 can be a pedal type.

Figure 2:
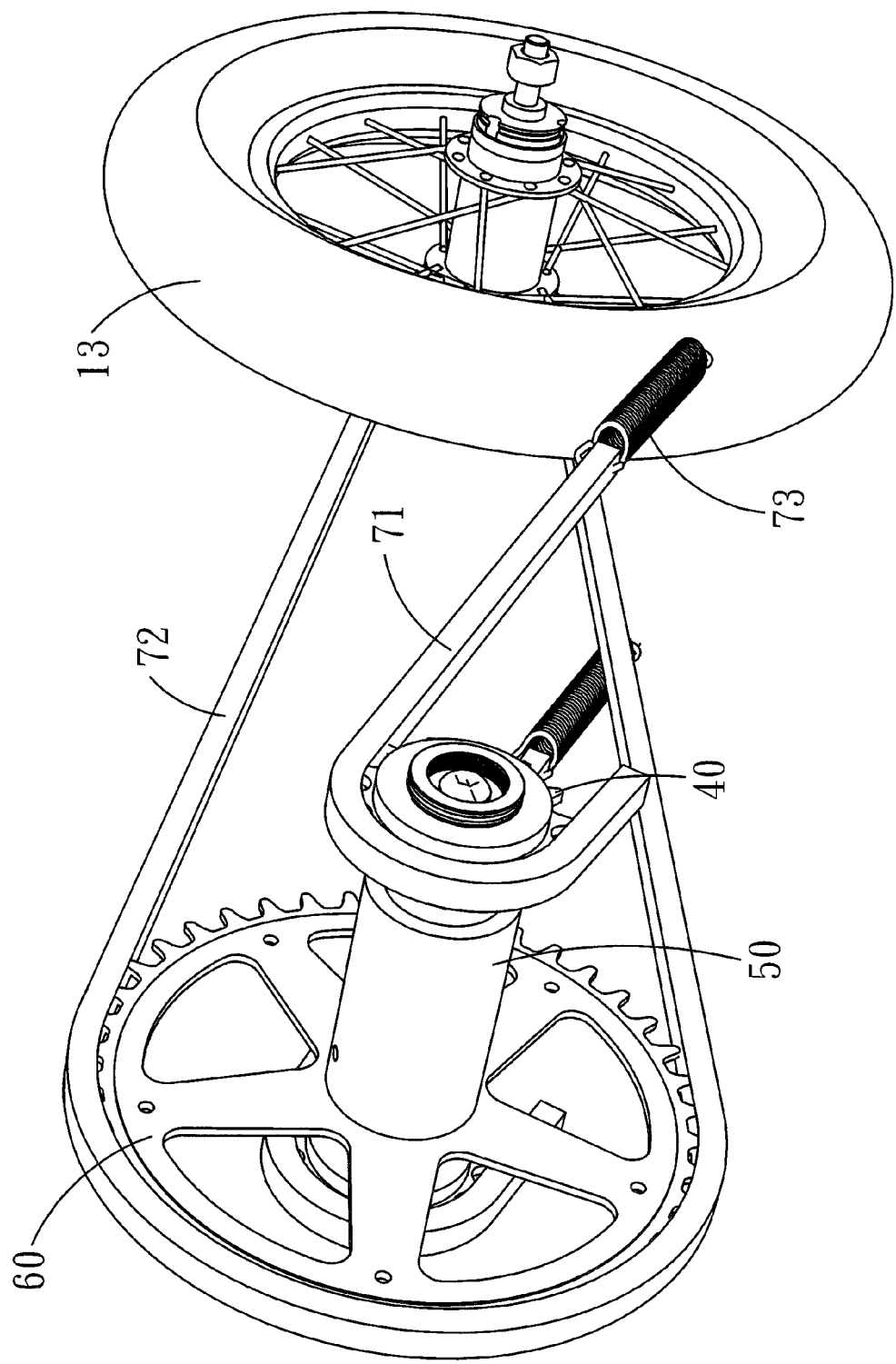
FIG. 2 is a three-dimensional drawing of a portion structure of a leisure exercise apparatus according to the invention

The spindle component 50 is disposed to the rack body 10. Please also refer to FIG. 2, and the shaft core of the spindle component 50 is installed with at least a connection sleeve 51. At least an unidirectional flywheel 40 is correspondingly disposed to the connection sleeve 51 of the spindle component to provide unidirectional transmission power as shown in the embodiment of the figure. The shaft core of the spindle component 50 is disposed with two connection sleeves 51 and two unidirectional flywheels 40.

Figure 3:
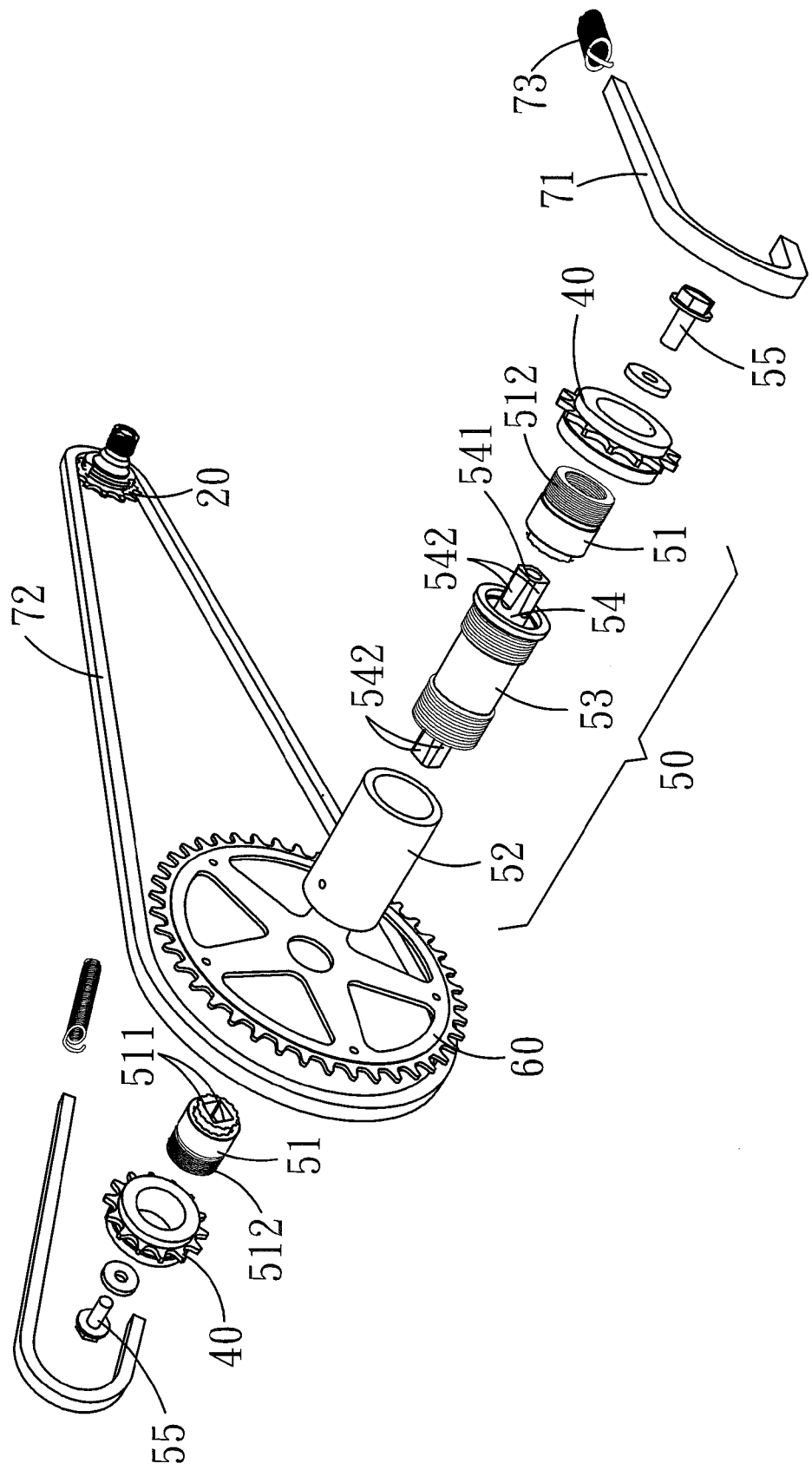
FIG. 3 is a decomposition drawing of a portion structure of a leisure exercise apparatus according to the invention.
Figure 4:
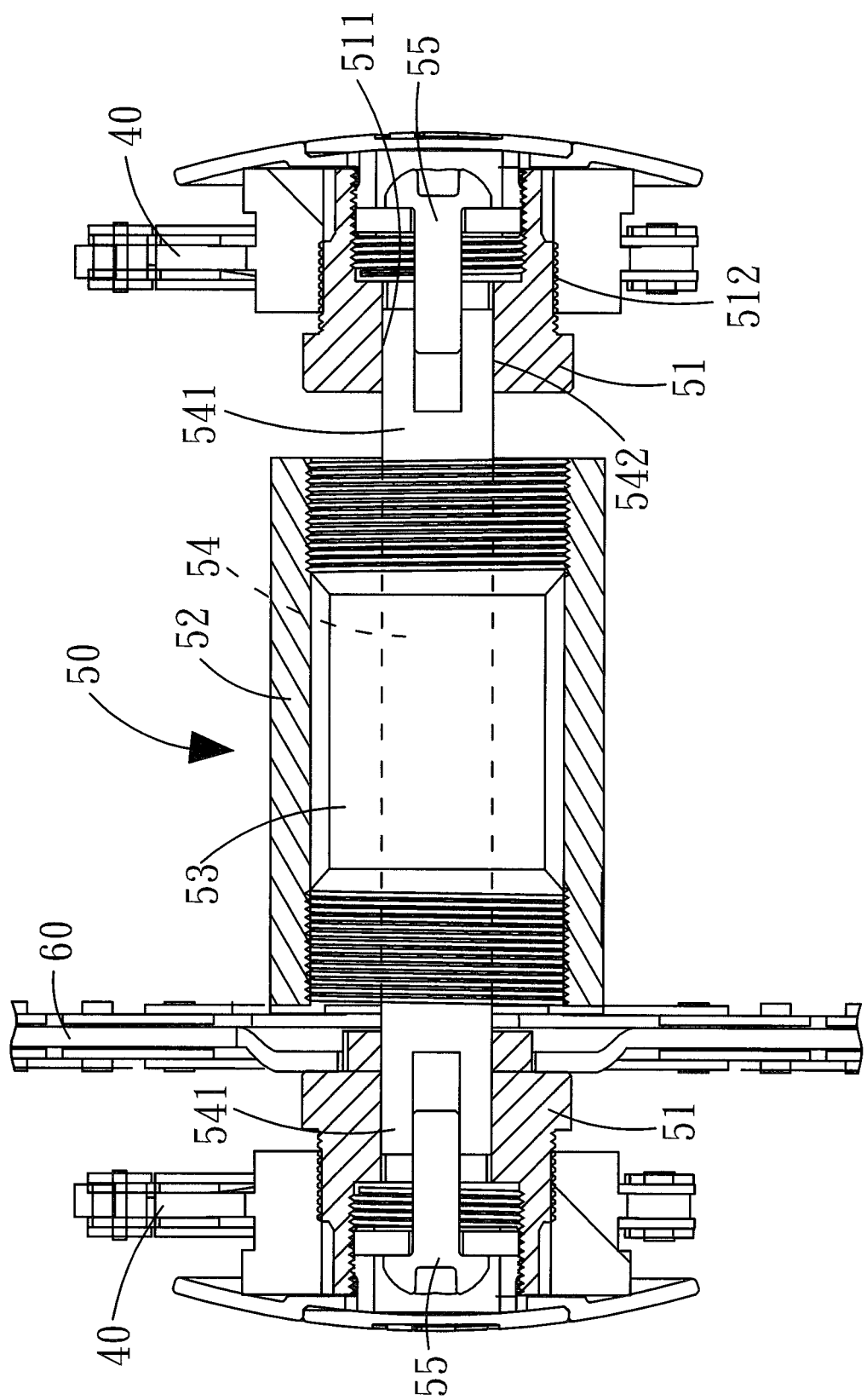
FIG. 4 is a structure cross-sectional drawing of a portion structure according to the invention.

The spindle component can be bottom bracket parts as shown in FIG. 3 and FIG. 4 and has a bottom tube 52 and a middle tube 53 located inside the bottom tube 52. A bottom shaft core 54 is disposed inside the middle tube 53, wherein the bottom shaft core 54 can be combined to the middle tube 53 through the rotary component (not shown in the figure, and the rotary components, for example, are bead bowls, bushings, bearings and the like). Two ends of the bottom shaft core 54 are respectively exposed on the bottom tube 52 to form a fastening portion 541. The connection sleeve 51 is incorporated with the disposition type of the fastening portion 541 of the bottom shaft core to mutually fasten as a whole by means of fitting or screwing or off-set, and a plurality of first rotary limiting portions 542 is disposed to an external wall surface of a predetermined section of the fastening portion 541. A plurality of second rotary limiting portion 511 respectively correspondingly to each first rotary limiting portion 542 is disposed to a section external wall of the connection sleeve 51 relatively fit and stretched into the fastening portion 541, capable of preventing the bottom shaft core 54 and the connection sleeve 51 from relatively rotating. While in implementation, each first rotary limiting portion 542 can follow the cross section axially extended and arranged from the middle tube 53, wherein the cross section is a planar shape while each second rotary limiting portion 511 can follow the cross section axially extended and arranged from the connection sleeve 51, wherein the cross section is also a planar shape. The connection sleeve 51 is fastened to the fastening portion 541 of the bottom shaft core through at least a locking member 55 (or a screw), and the connection sleeve 51 also has a screwing portion 512 provided for assembling the unidirectional flywheels 40.

The chain wheel 60 is mounted to the shaft core of the spindle component 50. Please also refer to FIG. 1, the driving belt 71 is circularly disposed to the unidirectional flywheels 40, and one end of the belt is disposed to the branch bar 31 while another end is disposed near the rear end of the rack body 10 by means of towing of an elastic component 73, and the branch bar 31 of the braking component has the acting force for upwardly springing and swinging any time. The transmission belt 72 is circularly disposed between the chain wheel 60 and the rear wheel shaft gear 20. In addition, one end of the driving belt and the elastic component can be disposed to the branch bar.

Figure 5:
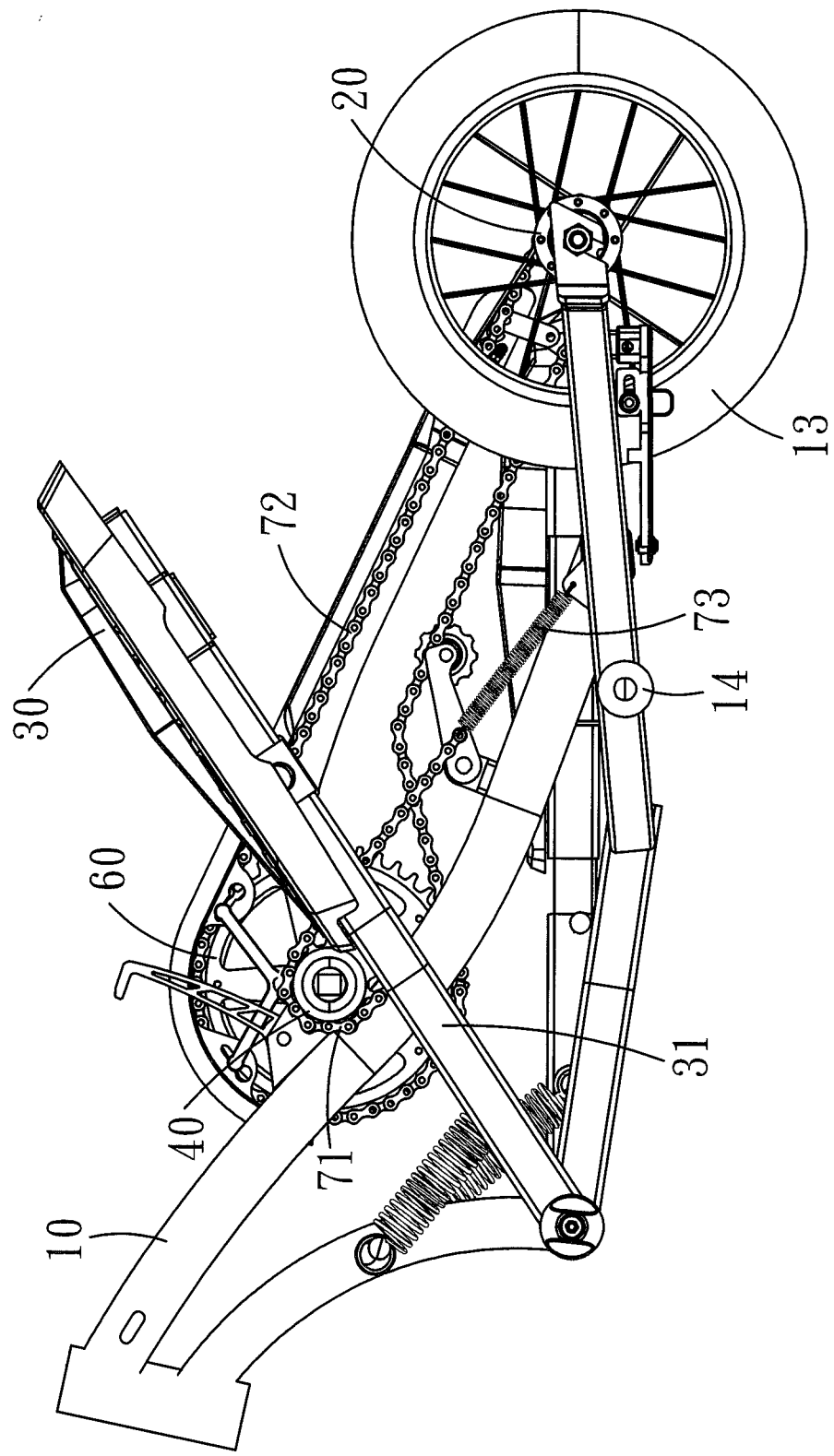
FIG. 5 is a motion diagram of a portion structure according to the invention.

Please also refer to FIG. 5, by utilizing the foregoing components, when a user downwardly treads on the braking component 30, the branch bar 31 will pull the driving belt 71 and enables the unidirectional flywheels 40 and the chain wheel 60 at the same axis to synchronously rotate. The chain wheel 60 can drive the rear wheel shaft gear 20 and the rear wheel 13 through the transmission belt 72 so that the leisure exercise apparatus can be moved. Further, while raising feet of treading on the braking component 30, the acting force of flexible restoration generated by the elastic component 73 is incorporated with idle operation of the unidirectional flywheels 40 to allow the driving belt 71 to pull the branch bar 31 again so that the braking component 30 automatically performs upward swing motion to prepare next treading motion. Moreover, a lower blocking body 14 corresponding to the branch bar 31 of the braking component is disposed below the rack body and performs a position limiting with respect to the location where the branch bar 31 is downwardly swung.

It should be noted that after the bottom tube is firstly and fixedly disposed to the rack body together with the middle tube, the connection sleeve can be combined with the unidirectional flywheels and the chain wheel as a whole. Afterward the connection sleeve is simply and respectively disposed to the fastening portion at two ends of the bottom shaft core so that the unidirectional flywheel and the chain wheel are quickly and exactly combined to the spindle component and the rack body. When the unidirectional flywheel is driven by the braking component to rotate, the chain wheel coaxially rotates through the coaxial rotation effect of the connection sleeve and the bottom shaft core so as to further drive the rear wheel for rotating. The spindle component in the foregoing embodiment can be a bottom bracket parts used in a normal bicycle. The spindle component can also be a bead bowl, a bushing and a bearing.

While the means of specific embodiments according to the present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An up and down restoration treading leisure exercise apparatus comprising:
   a rack body, an upper portion and a lower portion in front of the rack body respectively disposed with a handle and a front wheel, a rear end of the rack body disposed with a rear wheel;
   a rear wheel shaft gear axially disposed to a rear wheel shaft core;
   a braking component pivoted to the rack body through a branch bar;
   a spindle component disposed to the rack body, a shaft core of the spindle component disposed with at least connection sleeve;
   at least an unidirectional flywheel correspondingly disposed to the connection sleeve of the spindle component to provide unidirectional transmission power;
   a chain wheel disposed to a core of the spindle component;
   a driving belt circularly disposed to the unidirectional flywheel to allow the branch bar of the braking component to have an acting force of upwardly springing and swinging; and
   a transmission belt circularly disposed between the chain wheel and the rear wheel shaft gear;
   when a user end downwardly treading the braking component, the branch bar pulling the driving belt and enabling the unidirectional flywheel and the chain wheel at a same axis to synchronously rotate, the chain wheel driving the rear wheel shaft gear and the rear wheel through the transmission belt; while raising feet of the user end of treading the braking component, the driving belt incorporated with an idle operation of the unidirectional flywheel, the driving belt pulling the branch bar again and enabling the braking component to automatically perform upward swinging motion so as to prepare next treading motion,
   wherein the spindle component is bottom bracket parts having a bottom tube and a middle tube located inside the bottom tube, and a bottom shaft core is fit inside the middle tube, and two ends of the bottom shaft core are respectively exposed on the bottom tube to form a fastening portion.

2. The up and down restoration treading leisure exercise apparatus of claim 1, wherein the connection sleeve is incorporated with a disposition configuration of the fastening portion of the bottom shaft core to mutually fasten as a whole through fitting or screwing or off-set.

3. The up and down restoration treading leisure exercise apparatus of claim 2, wherein the connection sleeve is fastened to the fastening portion of the bottom shaft core through at least a locking member.

4. The up and down restoration treading leisure exercise apparatus of claim 2, wherein a plurality of first rotary limiting portions is disposed to an external wall surface of a predetermined section of the fastening portion, and a plurality of second rotary limiting portions respectively corresponding to each first rotary limiting portion is disposed to a section external wall of the connection sleeve relatively fit and stretched into the fastening portion.

5. The up and down restoration treading leisure exercise apparatus of claim 1, wherein the spindle component is a bead bowl, a bushing or a bearing.

6. The up and down restoration treading leisure exercise apparatus of claim 1, wherein the connection sleeve has a screwing portion for assembling the unidirectional flywheel.

7. The up and down restoration treading leisure exercise apparatus of claim 1, wherein the connection sleeve is combined with the flywheel and the chain wheel as a whole.

8. The up and down restoration treading leisure exercise apparatus of claim 1, wherein a lower blocking body corresponding to the branch bar of the braking component is disposed below the rack body.

9. The up and down restoration treading leisure exercise apparatus of claim 1, wherein one end of the driving belt is disposed to the branch bar while another end of the driving belt is disposed near a rear end of the rack body through an elastic component.

10. The up and down restoration treading leisure exercise apparatus of claim 1, wherein one end of the driving belt is disposed to the branch bar while another end of the driving belt is disposed to the branch bar by towing of an elastic component.

11. The up and down restoration treading leisure exercise apparatus of claim 1, wherein the rear wheel shaft gear is replaced by a rear wheel shaft flywheel.

\* \* \* \* \*